United States Patent
Yan et al.

(10) Patent No.: US 11,672,024 B2
(45) Date of Patent: Jun. 6, 2023

(54) METHOD AND APPARATUS FOR COMMUNICATION BASED ON A RESOURCE CONFIGURATION

(71) Applicant: LENOVO (BEIJING) LIMITED, Beijing (CN)

(72) Inventors: Zhi Yan, Beijing (CN); Haipeng Lei, Beijing (CN); Hongmei Liu, Beijing (CN); Jie Shi, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/280,084

(22) PCT Filed: Dec. 21, 2018

(86) PCT No.: PCT/CN2018/122874
§ 371 (c)(1),
(2) Date: Mar. 25, 2021

(87) PCT Pub. No.: WO2020/124602
PCT Pub. Date: Jun. 25, 2020

(65) Prior Publication Data
US 2022/0046721 A1    Feb. 10, 2022

(51) Int. Cl.
*H04W 74/08*   (2009.01)
*H04L 1/00*    (2006.01)

(52) U.S. Cl.
CPC ....... *H04W 74/0841* (2013.01); *H04L 1/0003* (2013.01); *H04L 1/0038* (2013.01); *H04W 74/0875* (2013.01)

(58) Field of Classification Search
CPC ... H04L 1/0003; H04L 1/0038; H04L 5/0053; H04L 5/0078; H04L 5/0094;
(Continued)

(56) References Cited

U.S. PATENT DOCUMENTS 8,626,350 B2   1/2014 Al-hamouz et al.
9,614,643 B2*  4/2017 Kim ............... H04L 1/0038
(Continued)

FOREIGN PATENT DOCUMENTS

CN    105338633 A    2/2016
CN    108271259 A    7/2018
(Continued)

OTHER PUBLICATIONS

International Searching Authority, "Notification of Transmittal of the International Search Report and the Written Opinion of the International Searching Authority, or the Declaration", PCT/CN2018/122874, dated Dec. 21, 2018, pp. 1-6.
(Continued)

*Primary Examiner* — Stephen J Clawson
(74) *Attorney, Agent, or Firm* — Kunzler Bean & Adamson

(57) ABSTRACT

Method and apparatus for transmission of data based on a resource configuration and reception of a response signal are disclosed. The apparatus includes a receiver that receives a resource configuration; and a transmitter that transmits a data based on the resource configuration; wherein the receiver further receives a feedback control signal of the data in a first search space; wherein the resource configuration includes at least one of: a resource for the data, a period of the resource P, a duty cycle of the resource D, a duty period of the resource Ton, a frequency band of the feedback control signal, a transport block size of the data, a modulation and code scheme of the data, a number of repetitions of the feedback control signal R, a first scaling factor G of the first search space, a reduced blind detection indication, and a response window size T to receive the feedback control signal.

20 Claims, 9 Drawing Sheets

(58) Field of Classification Search
CPC ............ H04W 52/02; H04W 52/0216; H04W 74/0841; H04W 74/0875; H04W 72/12; Y02D 30/70

See application file for complete search history.

(56) References Cited

U.S. PATENT DOCUMENTS

| | | | | |
|---|---|---|---|---|
| 10,667,323 | B1* | 5/2020 | Shih | H04W 72/0493 |
| 2014/0133331 | A1* | 5/2014 | Fu | H04L 5/0053 370/252 |
| 2017/0135075 | A1* | 5/2017 | Jiang | H04W 76/14 |
| 2018/0279315 | A1* | 9/2018 | Salem | H04L 1/0003 |
| 2019/0349147 | A1* | 11/2019 | Aiba | H04L 5/0094 |
| 2019/0357187 | A1* | 11/2019 | Sun | H04L 1/1896 |
| 2021/0410180 | A1* | 12/2021 | Tsai | H04L 1/1819 |
| 2022/0022247 | A1* | 1/2022 | Agiwal | H04W 76/30 |

FOREIGN PATENT DOCUMENTS

| | | | |
|---|---|---|---|
| EP | 3411976 A1 | 12/2018 | |
| EP | 3411976 B1 * | 12/2018 | ............... H04L 1/08 |
| WO | 2018126402 A1 | 7/2018 | |
| WO | 2018204886 A1 | 11/2018 | |

OTHER PUBLICATIONS

Huawei, Hisilicon, UL transmission in preconfigured resource, 3GPP TSG RAN WG1 Meeting #95, R1-1812142, Nov. 12-16, 2018, pp. 1-8, Spokane, USA.

Sierra Wireless, LTE-M Pre-configured UL Resources Design Considerations, 3GPP TSG RAN WG1 Meeting #95, R1-1812724, Nov. 12-16, 2018, pp. 1-11, Spokane, USA.

* cited by examiner

METHOD AND APPARATUS FOR COMMUNICATION BASED ON A RESOURCE CONFIGURATION

FIELD

The subject matter disclosed herein relates generally to wireless communication, and more particularly relates to transmission of data based on a resource configuration and reception of a response signal.

BACKGROUND

The following abbreviations and acronyms are herewith defined, at least some of which are referred to within the following description.

Third Generation Partnership Project ("3GPP"), New Radio ("NR"), Evolved Node B ("eNB"), 5G Node B ("gNB"), Downlink ("DL"), Uplink ("UL"), Long Term Evolution ("LTE"), LTE Advanced ("LTE-A"), Evolved UMTS Terrestrial Radio Access Network ("E-UTRAN"), Acknowledgement ("ACK"), Negative Acknowledgement ("NACK"), Hybrid Automatic Repeat Request ("HARQ"), Hybrid Automatic Repeat Request-Positive Acknowledgement ("HARQ-ACK"), Hybrid Automatic Repeat Request-Negative Acknowledgement ("HARQ-NACK"), Machine Type Communication ("MTC"), enhanced MTC ("eMTC"), Narrow Band Internet of Things ("NBIoT"), Internet of Things ("IoT"), Physical Downlink Control Channel ("PDCCH"), MTC Physical Downlink Control Channel ("MPDCCH"), Narrowband Physical Downlink Control Channel ("NPDCCH"), Physical Downlink Shared Channel ("PDSCH"), Time Division Duplex ("TDD"), Frequency-Division Multiplexing ("FDM"), Time-Division Multiplexing ("TDM"), Code-Division Multiplexing ("CDM"), User Entity/Equipment (remote device) ("UE"), Network Equipment ("NE"), Discontinuous Reception ("DRX"), Low Power Wide Area ("LPWA"), Paging Occasion ("PO"), System Information Block ("SIB"), Bandwidth Reduced Low Complexity/Coverage Enhancement ("BL/CE"), Identification ("ID"), Non-Access Stratum("NAS"), Preconfigured Uplink Resource ("PUR"), Common Search Space ("CSS"), UE-specific Search Space ("USS"), Single-Carrier Frequency-Division Multiple Access ("SC-FDMA"), Transport Block Size ("TBS"), Modulation Coding Scheme ("MCS"), Downlink Control Indicator ("DCI"), Random Access Channel ("RACH"), Physical Random Access Channel ("PRACH"), Medium Access Control ("MAC"), Downlink Shared Channel ("DL-SCH"), Uplink Shared Channel ("UL-SCH"), Random Access Response ("RAR"), Radio Network Temporary Identifier ("RNTI"), Random Access Radio Network Temporary Identifier ("RA-RNTI"), Single Frequency Network ("SFN").

In wireless communication, such as a Third Generation Partnership Project ("3GPP") mobile network, various types of remote devices, also known as user equipment ("UE"), may be used. For example, Machine Type Communication ("MTC") UE may be used in addition to conventional types of terminal devices, such as mobile phones, smartphones, data modems, mobile computers, or the like.

MTC is expected to play an essential role within future 5G systems. It has been identified as an important use-case for 5G NR wireless technology. Applications of this type are characterized by huge volumes of end-points and connections, using low-cost devices and modules for wireless sensor networks, connected homes, smart metering and so on. It is expected that a new network is able to handle significantly more connections efficiently, which is prompting the development of new technologies to support Bandwidth Reduced Low Complexity/Coverage Enhancement ("BL/CE") UEs.

Enhanced MTC (eMTC) defines two kinds of coverage enhancement mode (CE mode): CE mode A and CE mode B, which is indicated by higher layer signaling. CE mode A describes a set of eNB/UE behaviors without repeated transmissions or with a small number of repeated transmissions, while CE mode B describes a set of eNB/UE behaviors with a large number of repeated transmissions.

MTC UEs typically transmit and receive only small amounts of data, which may occur more or less infrequently, e.g., once per week to once per minute. MTC UEs may also be polled for data, resulting in an irregular pattern of data transmission. MTC UEs are typically assumed to be autonomous sensor devices, alarm devices, actuator devices, remote control devices, or the like, which communicate with application servers, rather than being used for communication by a human user. Hence, this type of communication may also be referred to as machine-to-machine ("M2M") communication and the devices may be denoted as machine devices ("MDs"). MTC UEs are typically characterized by a modest bit rate and sparse communication. MTC UEs may therefore be implemented with low-performance data transmission capabilities. Further, MTC devices typically need to be very energy efficient.

NBIoT is a standards-based low power wide area ("LPWA") technology developed to enable a wide range of new IoT devices and services. NBIoT significantly improves the power consumption of user devices, system capacity and spectrum efficiency. More than 10 years of battery life can be supported for a wide range of use cases.

In the RAN 80 plenary meeting of 3GPP, new work items for Rel.16 MTC are approved. The objective is to specify improvements for machine-type communications BL/CE UEs, including support for transmission in preconfigured uplink resources ("PUR") in idle and/or connected mode based on SC-FDMA waveform for UEs with a valid timing advance in order to improve UL transmission efficiency and/or UE power consumption.

SUMMARY

Methods and apparatuses for providing transmission of data based on a resource configuration and reception of a response signal are disclosed.

In one embodiment, there is provided an apparatus comprising: a receiver that receives a resource configuration; and a transmitter that transmits a data based on the resource configuration; wherein the receiver further receives a feedback control signal of the data in a first search space; wherein the resource configuration includes at least one of: a resource for the data, a period of the resource P, a duty cycle of the resource D, a duty period of the resource Ton, a frequency band of the feedback control signal, a transport block size of the data, a modulation and code scheme of the data, a number of repetitions of the feedback control signal R, a first scaling factor G of the first search space, a reduced blind detection indication, and a response window size T to receive the feedback control signal.

In some embodiments, a period of the first search space is scaled from a period of a second search space by a second scaling factor K.

In some embodiments, the resource configuration further includes the second scaling factor K.

In some embodiments, the second scaling factor K is determined by at least one of:

the period of the resource P, the response window size T, and a first number of control signal candidates N1 between two adjacent resources.

In some embodiments, the second search space is MPDCCH or NPDCCH type 2 common search space for eMTC and NBIoT.

In some embodiments, a number of repetitions of the first search space is scaled from a number of repetitions of a second search space by a third scaling factor L.

In some embodiments, the resource configuration further includes the third scaling factor L.

In some embodiments, the second search space is MPDCCH or NPDCCH type 2 common search space for eMTC and NBIoT.

In some embodiments, the apparatus receives the feedback control signal of the data in a response window; and the response window starts from a time slot that contains the end of data transmission plus a first time offset, and the response window has a second time duration.

In some embodiments, the first time offset includes a third number of a period of a control channel (MPDCCH or NPDCCH) N3; and the resource configuration further includes the third number of the period of the control channel (MPDCCH or NPDCCH) N3.

In some embodiments, the second time duration is scaled from a random access response window by a fourth scaling factor W.

In some embodiments, the resource configuration further includes the fourth scaling factor W.

In some embodiments, the random access response window is the window for monitoring the response signal after preamble transmission in RACH procedure.

In some embodiments, wherein the first search space is started in a narrowband, and an index of the narrowband is determined by at least one of: the period of the resource T, a RNTI, a coverage enhancement mode, and a preamble index of the latest access.

In another embodiment, there is provided a method comprising: receiving, by a receiver, a resource configuration defining a resource for communication; transmitting, by a transmitter, data based on the resource configuration; and receiving, by the receiver, a feedback control signal of the data in a first search space; wherein the resource configuration includes at least one of: a resource for the data, a period of the resource P, a duty cycle of the resource D, a frequency band of the feedback control signal, a transport block size of the data, a modulation and code scheme of the data, a number of repetitions of the feedback control signal R, a first scaling factor G of the first search space, a reduced blind detection indication, and a response window size T to receive the feedback control signal.

According to one aspect of the disclosure, a design of search space after uplink transmission based on PUR is provided. It allows flexibly scaling the search space period, from a common search space, by explicit PUR configuration, or by implicitly derived from the period of predefined uplink resource for different UEs.

Additionally or alternatively, it may also allow flexibly scaling the repetition number and response window for control signal or search space by explicit PUR configuration.

Additionally or alternatively, it introduces an additional time offset for uplink transmission and control signal monitoring to offload the scheduling overhead for eNB and save power for different UEs.

Further additionally or alternatively, it allows flexibly deriving the starting narrowband control signal monitoring for different UEs by existing parameters. This may offload the system and at least partially solve or alleviate the collision problems.

In some embodiments, the disclosed search space after uplink transmission based on PUR is compatible with the MPDCCH/NPDCCH type 2 common search space with some enhancement. The search space may effectively reduce the blind detection number and save the UE power. Additionally or alternatively, the search space may increase the system resource efficiency. Further additionally or alternatively, the search space may effectively offload the response reception of the UE, thereby at least partially solve or alleviate the collision problems and increase the capacity of the system.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
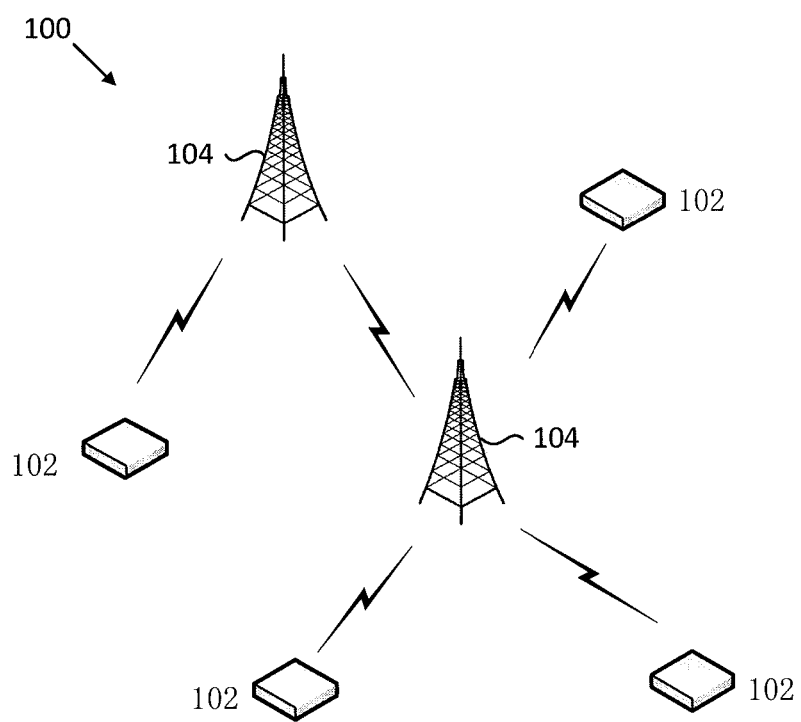
FIG. 1 is a schematic block diagram illustrating an embodiment of a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as a nomenclature for references to relevant devices, components, procedural steps, and etc. without implying any spatial or chronological orders, unless expressly specified otherwise. For example, a "first device" and a "second device" may refer to two separately form devices, or two parts or components of the same device. Similarly, a "first step" of a method or process may be carried or performed after, or simultaneously with, a 'second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 depicts an embodiment of a wireless communication system 100 for an MTC or NBIoT network. In one embodiment, the wireless communication system 100 includes MTC UEs 102 and a network equipment 104. Even though a specific number of MTC UEs 102 and network equipment 104 are depicted in FIG. 1, one skilled in the art will recognize that any number of MTC UEs 102 and network equipment 104 may be included in the wireless communication system 100.

In one embodiment, the MTC UEs 102 may be autonomous sensor devices, alarm devices, actuator devices, remote control devices, or the like. The MTC UEs 102 may also be referred to as remote devices, subscriber units, terminals, mobile terminals, fixed terminals, subscriber stations, user equipment (UE), user terminals, a device, or by other terminology used in the art.

The network equipment 104 may be distributed over a geographic region. In certain embodiments, a network equipment 104 may also be referred to as an access point, an access terminal, a base, a base station, a Node-B, an eNB, a gNB, a Home Node-B, a relay node, a device, or by any other terminology used in the art. Throughout this specification, a reference to base station may refer to any one of the above referenced type of the network equipment 104, such as eNG and gNB. The network equipment 104 are generally part of a radio access network that includes one or more controllers communicably coupled to one or more corresponding network equipment 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with 3GPP 5G new radio (NR). More generally, however, the wireless communication system 100 may implement some other open or proprietary communication protocols.

The network equipment 104 may serve a number of MTC UEs 102 within a serving area, for example, a cell (or a cell sector) or more cells via a wireless communication link. The network equipment 104 transmit DL communication signals to serve the MTC UEs 102 in the time, frequency, and/or spatial domain.

Figure 2:
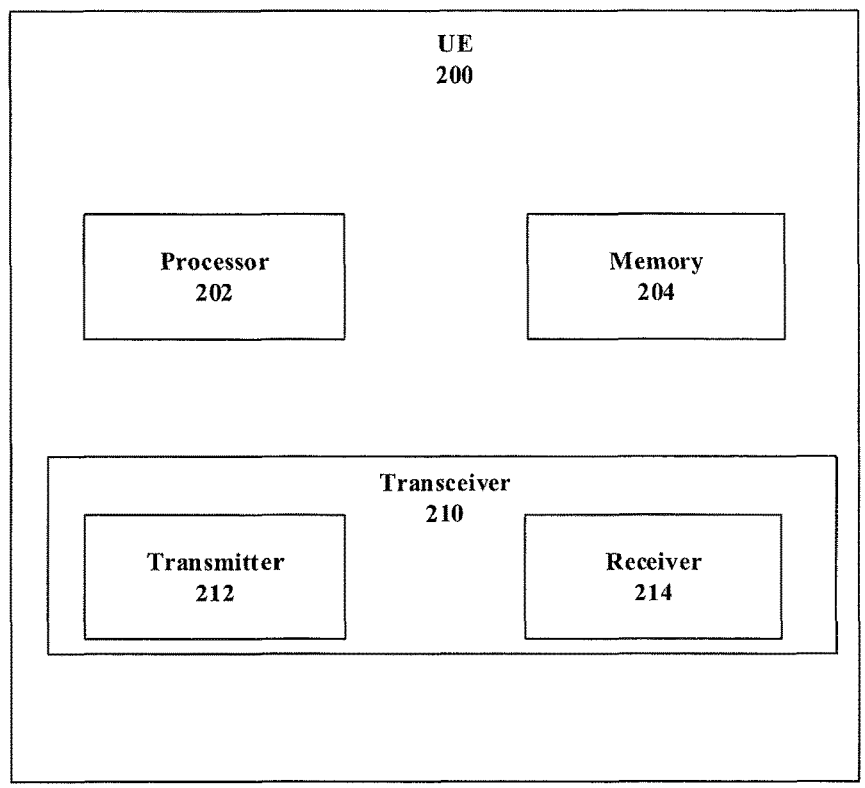
FIG. 2 is a schematic block diagram illustrating components of a UE according to one embodiment.

FIG. 2 is a schematic block diagram illustrating components of a UE according to one embodiment. The UE 200 may be an MTC remote device. The UE 200 may include a processor 202, a memory 204, and a transceiver 210.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

In some embodiments, the processor 202 controls the transceiver 210 to receive various configuration and data from a Network Equipment. The processor 202 may monitor the WUS received via the transceiver 210 and determines whether to monitor the paging message based on the WUS received.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to a Network Equipment. In some embodiments, the memory 204 also stores program code and related data.

The transceiver 210, in one embodiment, is configured to communicate wirelessly with a Network Equipment. In certain embodiments, the transceiver 210 comprises a transmitter 212 and a receiver 214. The transmitter 212 is used to transmit UL communication signals to Network Equipment and the receiver 214 is used to receive DL communication signals from Network Equipment. For example, the transmitter 212 may transmit a HARQ-ACK including feedbacks for one or more DL transmissions. As another example, the receiver 214 may receive various configurations/data from Network Equipment.

The transmitter 212 and the receiver 214 may be any suitable types of transmitters and receivers. Although only one transmitter 212 and one receiver 214 are illustrated, the transceiver 210 may have any suitable number of transmitters 212 and receivers 214. For example, in some embodiments, UE 200 includes a plurality of transmitter 212 and receiver 214 pairs for communicating on a plurality of wireless networks and/or radio frequency bands, each transmitter 212 and receiver 214 pair configured to communicate on a different wireless network and/or radio frequency band than the other transmitter 212 and receiver 214 pairs.

Figure 3:
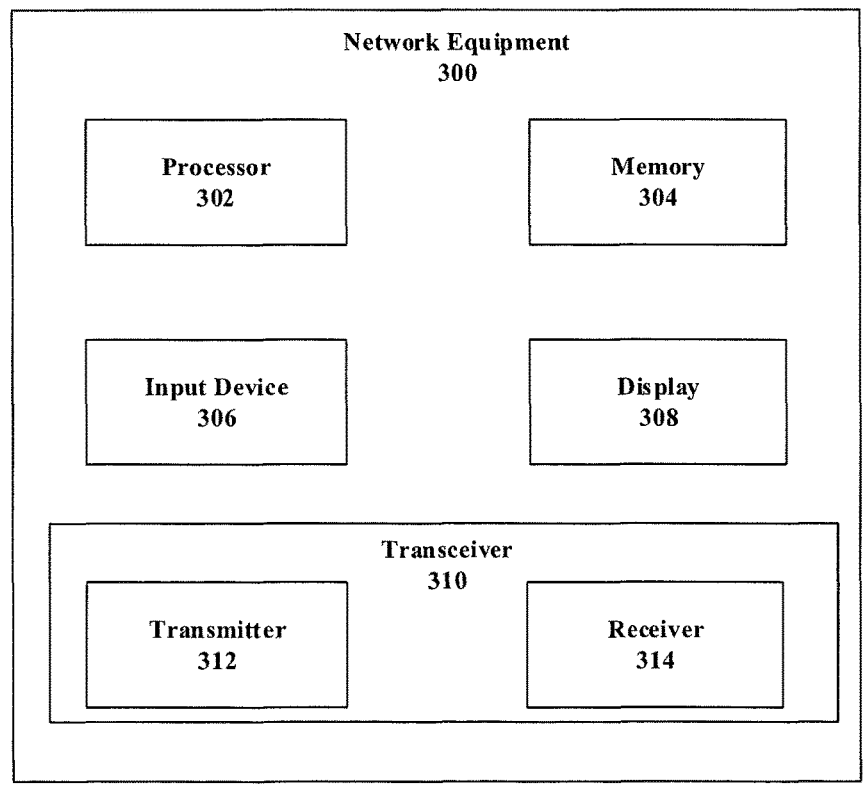
FIG. 3 is a schematic block diagram illustrating components of a network equipment according to one embodiment.

FIG. 3 is a schematic block diagram illustrating components of a network equipment according to one embodiment.

Network Equipment 300 includes one embodiment of eNB or gNB. The Network Equipment 300 may include a processor 302, a memory 304, an input device 306, a display 308, and a transceiver 310.

In some embodiments, the processor 302 controls the transceiver 310 to transmit DL signals/data to UE 200. The processor 302 may also control the transceiver 310 to receive UL signals/data from UE 200. For example, the processor 302 may control the transceiver 310 to receive a HARQ-ACK including feedbacks for one or more DL transmissions. In another example, the processor 302 may control the transceiver 310 to transmit a DL signals for various configurations to UE 200, as described above.

The transceiver 310, in one embodiment, is configured to communicate wirelessly with UE 200. In certain embodiments, the transceiver 310 comprises a transmitter 312 and a receiver 314. The transmitter 312 is used to transmit DL communication signals to UE 200 and the receiver 314 is used to receive UL communication signals from UE 200. For example, the receivers 314 may receive a HARQ-ACK codebook from UE 200. As another example, the transmitter 312 may transmit the various configurations/data of Network Equipment 300.

The transceiver 310 may communicate simultaneously with a plurality of UE 200. For example, the transmitter 312 may transmit DL communication signals to UE 200. As another example, the receiver 314 may simultaneously receive UL communication signals from UE 200. The transmitter 312 and the receiver 314 may be any suitable types of transmitters and receivers. Although only one transmitter 312 and one receiver 314 are illustrated, the transceiver 310 may have any suitable number of transmitters 312 and receivers 314. For example, Network Equipment 300 may serve multiple cells and/or cell sectors, wherein the transceiver 310 includes a transmitter 312 and a receiver 314 for each cell or cell sector.

Figure 4A:
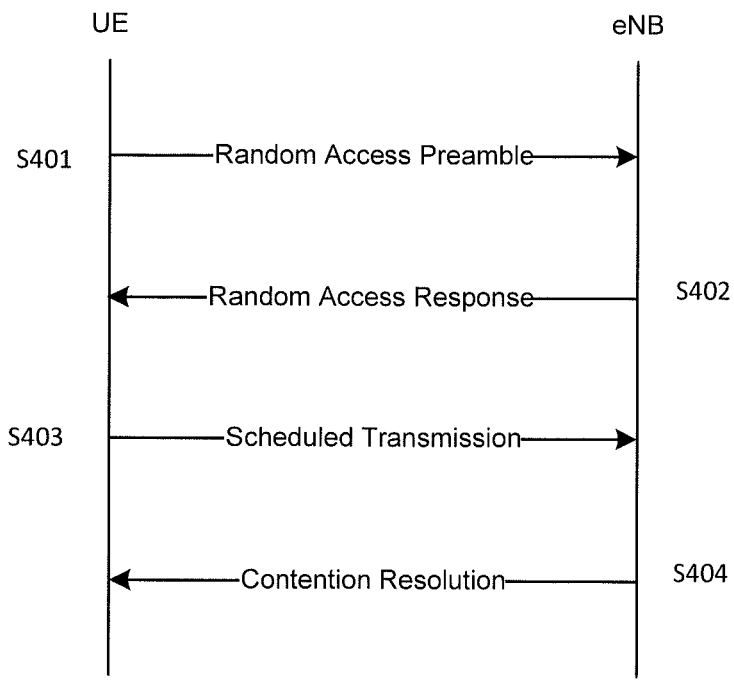
FIG. 4A is a schematic diagram illustrating a procedure of contention based random access.

FIG. 4A is a schematic diagram illustrating a procedure of contention based random access. There are four main steps in this contention base random access procedure, namely:

S401: the UE transmits a Random Access Preamble on Random Access Channel (RACH) in uplink;

S402: Random Access Response (RAR) generated by MAC, and transmitted from the base station on DL-SCH;

S403: the UE starts the first scheduled UL transmission on UL-SCH; and

S404: Contention Resolution on DL.

Figure 4B:
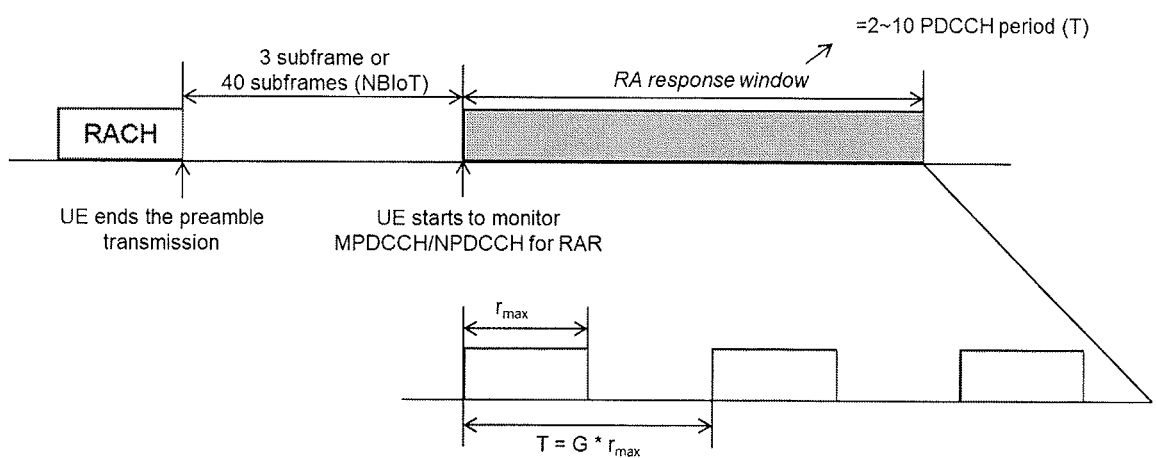
FIG. 4B is a schematic diagram illustrating a time sequence and allocation of resources of a random access procedure.

A time sequence and allocation of resources of a random access procedure is shown in FIG. 4B. As illustrated in the drawing, after the UE ends the preamble transmission, it waits for 3 subframes, or 40 subframes for NBIoT, and starts to monitor MPDCCH/NPDCCH for RAR. The RARs are potentially transmitted in a RA Response (RAR) Window, which may be configured to two to ten PDCCH periods by higher layer signaling. Furthermore, UE expects to the receive MPDCCH/NPDCCH scheduling RAR in configured narrowband with: RA-RNTI=1+floor (SFN/4).

The search space starts at 3 ms after preamble transmission and satisfies a condition within RAR window. Here, an MPDCCH/NPDCCH period T=G*Rmax, where the parameter Rmax is the repetition number of MPDCCH/NPDCCH in the type 2 common search space configured by higher layer signaling, the parameter G is a scaling factor, and may be given by the higher layer parameter and the RAR response window is configured as two to ten MPDCCH/NPDCCH period T by higher layer signaling.

The UEs, or MTC/eMTC devices, may receive MTC physical downlink control channel (MPDCCH) transmissions carrying RAR messages. MTC and eMTC devices may attempt to decode MPDCCH candidates in search spaces of time and frequency transmission resources. MPDCCHs may be transmitted in common search spaces (CSS). Base stations may transmit MPDCCHs conveying RAR messages in CSS selected based at least in part on a coverage enhancement (CE) level of a receiving UE and/or a narrowband used by a UE when transmitting a physical random access channel (PRACH).

Defined in 3GPP TS 36.213, for Type2-MPDCCH/NPDCCH common search space, locations of starting subframe k are given by k=$k_b$ where $k_b$ is the $b^{th}$ consecutive BL/CE DL subframe from subframe k0, and b=u·rj, and $$u = 0, 1, \ldots, \frac{r_{max}}{rj} - 1,$$

and j∈{1,2,3,4}, where subframe k0 is a subframe satisfying the condition $(10n_f + \lfloor n_s/2 \rfloor) \bmod T = \lfloor \alpha_{offset} \cdot T \rfloor$, where $T = r_{max} \cdot G$ For Type2-MPDCCH common search space, G is given by the higher layer parameter mPDCCH-startSF-CSS-RA-r13

$\alpha_{offset}=0$ and $r_{max}$ is given by higher layer parameter mPDCCH-NumRepetition-RA.

Figure 5A:
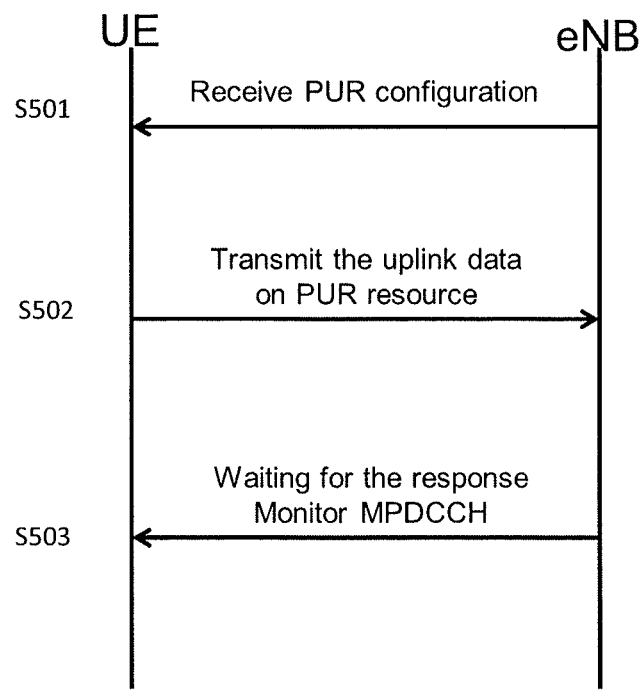
FIG. 5A is a schematic diagram illustrating a procedure of uplink data transmission based on PUR.

FIG. 5A is a schematic diagram illustrating a procedure of uplink data transmission based on PUR. The main procedure may be carried out in three steps:

Step S501: UE receives PUR configuration before transition to an IDLE mode;

Step S502: UE transmits uplink data based on PUR in IDLE mode; and

Step S503: UE monitors the response via a control signal, and waits to receive a feedback signal, e.g., ACK or NACK to the data or uplink retransmission grant.

In Step S501, the PUR configuration is sent from the base station and received by the UE. After receiving the PUR configuration, the UE may enter an IDLE mode. The resource configuration may include one or more of the following:

i. Time domain resources, including periodicity(s);
ii. Frequency domain resources;
iii. Repetition number and frequency hopping pattern;
iv. TBS(s) and/or MCS(s); and
v. Power control parameters.

In Step S502, the UE transmits data to the base station based on the PUR configuration in IDLE mode. The transmission may be carried out on resources according to the PUR configuration. Since the configuration of the resources is provided from the base station, the base station is already aware of the resources and will monitor the resources for UL transmission data. Therefore, the transmission of data on the preconfigured resources may be receivable by the base station without firstly re-establishing a communication connection.

In Step S503, after data transmission, the UE will expect to receive a response, also known as a feedback control signal via MPDCCH/NPDCCH. The response or feedback control signal may include message of ACK or NACK to the data, or uplink retransmission grant while unsuccessfully decoding the data. For dedicated PUR in IDLE mode, upon successful decoding by the base station of a PUR transmission, the UE can expect an explicit ACK. While upon unsuccessful decoding by eNB of a PUR transmission, the UE can expect a UL GRANT for retransmission on the MPDCCH/NPDCCH, or a NACK.

Figure 5B:
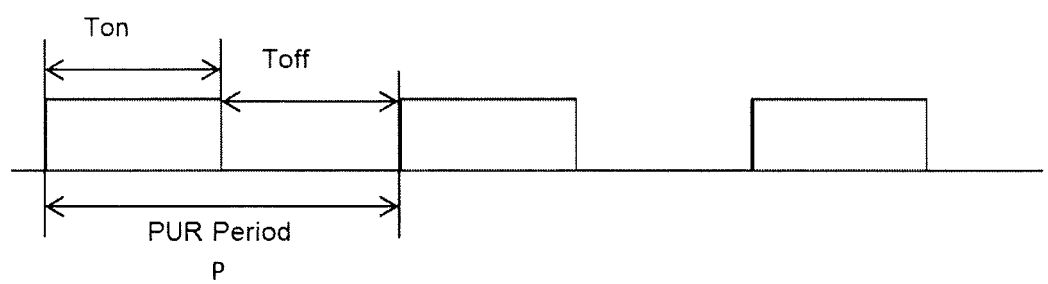
FIG. 5B is a schematic diagram illustrating an example of resources according to a PUR configuration.

FIG. 5B is a schematic diagram illustrating an example of resources according to a PUR configuration. In some embodiments, the PUR configuration may include information of PUR period P, PUR duty cycle D and PUR active time Ton. PUR period P refers to the time span of each resource cycle, including an active time Ton and an inactive time Toff. The PUR duty cycle D may be calculated according to D=Ton/P*100%.

Figure 6:
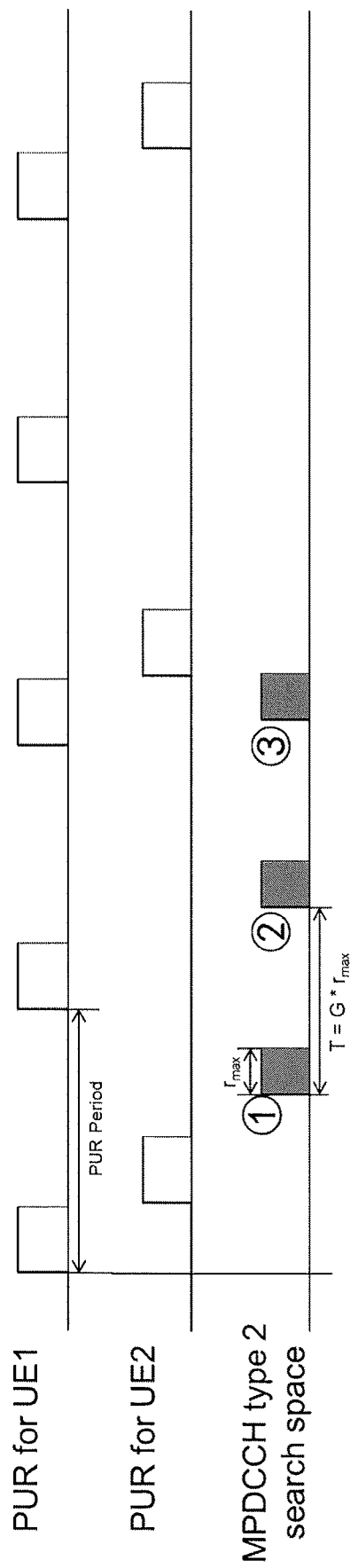
FIG. 6 is a schematic diagram illustrating an example of a search space for uplink transmission based on PUR using an MPDCCH/NPDCCH type 2 common search space.

FIG. 6 is schematic diagram illustrating an example of a search space for uplink transmission based on PUR using an MPDCCH/NPDCCH type 2 common search space. In this design, for example, the first terminal device UE1 and the second terminal device UE2 are configured with dedicated PUR configuration. The configuration of PUR is always UE specific for uplink transmission based on dedicated PUR. As shown in FIG. 6, the PUR for UE1 and the PUR for UE2 may have different PUR periods and different PUR duty cycles.

In this example, different UEs may have different MPDCCH/NPDCCH candidate(s) before the next PUR transmission occasion. As shown in FIG. 6, UE1 have only 1 MPDCCH/NPDCCH candidate while UE 2 have 3 MPDCCH/NPDCCH candidates before the next PUR transmission occasion. UE1 will has less MPDCCH/NPDCCH candidates or miss some of the PUR transmission occasions.

In another example shown in FIG. 6, all UEs are expected to receive the response in the first several MPDCCH/NPDCCH candidate occasions, for example, MPDCCH/NPDCCH candidates 1 and 2. MPDCCH/NPDCCH collision may be likely or even intense if the MPDCCH/NPDCCH candidates of all, or a large number of, UEs are in the first several MPDCCH/NPDCCH candidates.

Figure 7:
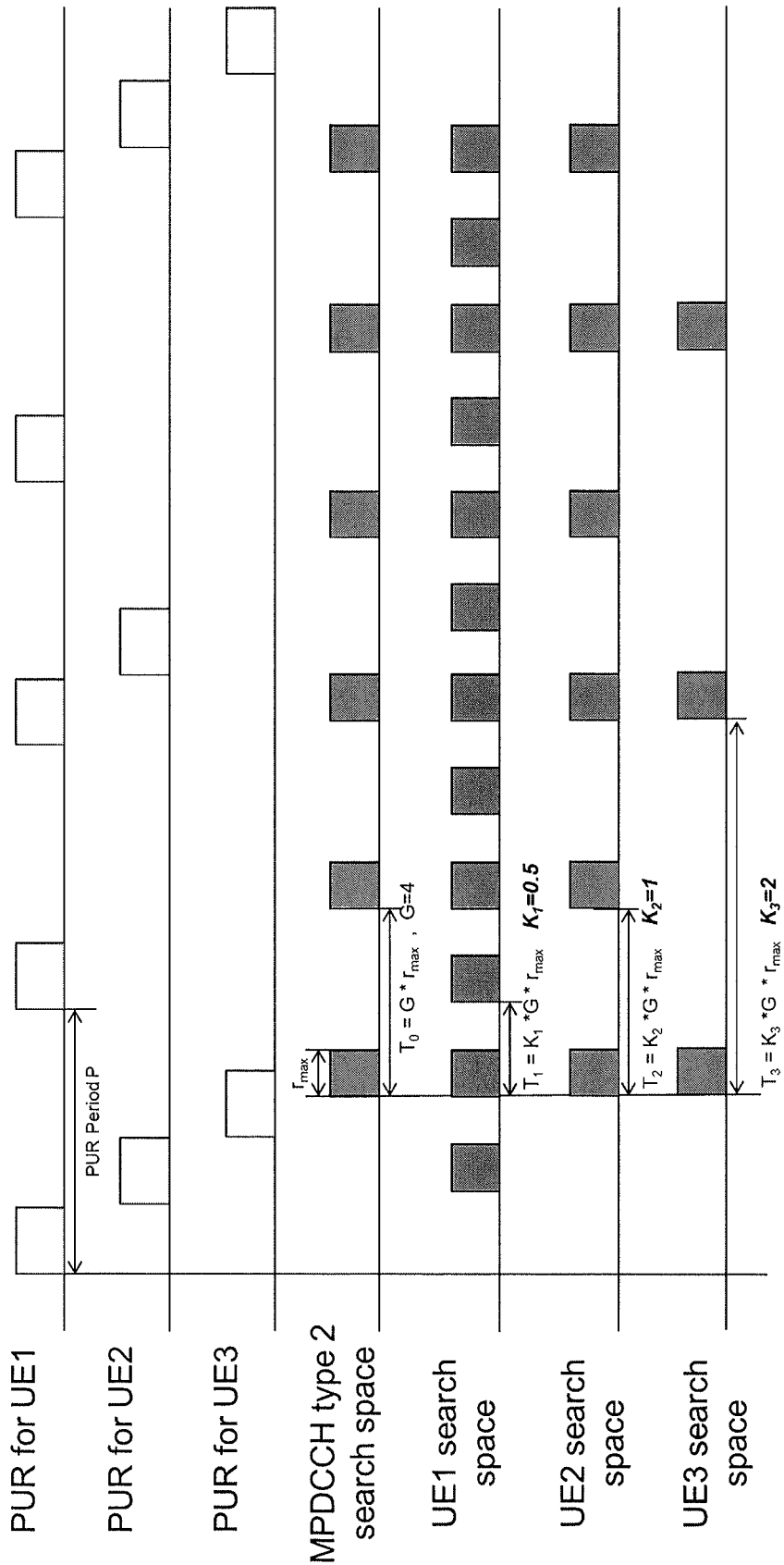
FIG. 7 is a schematic diagram illustrating exemplary designs of search space for uplink transmission based on PUR.

FIG. 7 is a schematic diagram illustrating some exemplary designs of search space for uplink transmission based on PUR. In the examples shown in FIG. 7, the MPDCCH/NPDCCH type 2 search space is configured by higher layer signaling in initial access stage, which includes the parameter of a first scaling factor G and in this case, given as 4. Rmax refers to the number of repetitions of the feedback control signal. Consequently, the MPDCCH/NPDCCH period may be provided as $T_0=G*Rmax$.

The apparatus may comprise a receiver 214 that receives a resource configuration; and a transmitter 212 that transmits a data based on the resource configuration; the receiver 214 further receives a feedback control signal of the data in a first search space. The resource configuration includes at least one of: a resource for the data, a period of the resource P, a duty cycle of the resource D, a duty period of the resource Ton, a frequency band of the feedback control signal, a transport block size of the data, a modulation and code scheme of the data, a number of repetitions of the feedback control signal R, a first scaling factor G of the first search space, a reduced blind detection indication, and a response window size T to receive the feedback control signal.

The reduced blind detection indication, in some embodiments, may be a parameter that is set TRUE if the repetition number of the control signal R is reduced with a predefined scaling factor.

A set of parameters of the resource configuration provided for one UE 200 may be different from a second set of parameters for another UE. Additionally or alternatively, a selected set of parameters may be configured differently for different UEs. Therefore, with this design, different resource configurations may be provided for different UEs 200. Therefore, a UE 200 may have its own search space, which configured differently from the search space of another UE.

As shown in FIG. 4A, the UE 200 receives, through its receiver 214, a PUR configuration before transition to IDLE mode, and will transmit through its transmitter 201 uplink data based on the PUR configuration in IDLE mode. Subsequently, the UE 200 expects to receive a feedback control signal, such as ACK, NACK, or uplink retransmission grant. The resource configuration includes at least one of: a resource for the data, a period of the resource P, a duty cycle of the resource D, a duty period of the resource Ton, a frequency band of the feedback control signal, a transport block size of the data, a modulation and code scheme of the data, a number of repetitions of the feedback control signal R, a first scaling factor G of the first search space, a reduced blind detection indication, and a response window size T to receive the feedback control signal.

In some embodiments, a period of the first search space is scaled from a period of a second search space by a second scaling factor K. The resource configuration may include the second scaling factor K.

The period of the MPDCCH/NPDCCH type 2 common search space T may be configured as $T=K*G*Rmax$. For example, a scaling factor $K_1=0.5$ is configured for the first terminal device UE1. The period of MPDCCH/NPDCCH $T_1$ of the UE1 search space may be $T_1=0.5*T_0$. A scaling factor $K_2=1$ is configured for the second terminal device UE2. The period of MPDCCH/NPDCCH $T_2$ of the UE2 search space may be $T_2=T_0$. A scaling factor $K_3=2$ is configured for the third terminal device UE3. The period of MPDCCH/NPDCCH $T_3$ of the UE3 search space may be $T_3=2*T_0$.

The second scaling factor K may be determined by at least one of: the period of the resource P, the response window size T, and a first number of control signal candidates N1 between two adjacent resources. The second search space is PDCCH type 2 common search space for eMTC and NBIoT. In one example, a first number of control signal candidates N1 between two adjacent resources is configured in the PUR configuration. The scaling factor K may be obtained by the UE 200 as $K=\text{floor}\{(P-Ton-\Delta)/(G*Rmax*N1)\}$. The $\Delta$ includes the transmission delay and UE terminal processing delay.

Alternatively, the scaling factor K may be directly provided in the PUR configuration.

In yet another example, the scaling factor K may be derived by the existing configured parameters, e.g., RAR window of RACH configuration M, the period of the MPDCCH/NPDCCH type 2 common search space $G*Rmax$, and the period of the PUR P, the duty period of the PUR Ton. Then, the UE will be able to derive the scaling factor K from $K=\text{floor}\{(P-D-\Delta)/(G*Rmax*M)\}$, here assuming that the number of the control signal candidates N1 between two adjacent resources is equal to the RAR window.

For search space after uplink transmission based on dedicated PUR, locations of starting subframe k are given by $k=k_b$ where $k_b$ is the $b^{th}$ consecutive BL/CE DL subframe from subframe k0, and $b=u \cdot rj$, and $$u = 0, 1, \ldots, \frac{r_{max}}{rj} - 1,$$

and $j \in \{1,2,3,4\}$,
where
subframe k0 is a subframe satisfying the condition $(10n_f + \lfloor n_s/2 \rfloor) \mod T = \lfloor \alpha_{offset} \cdot T \rfloor$, where $T = r_{max} \cdot G \cdot K$
For Type2-MPDCCH common search space, G is given by the higher layer parameter mPDCCH-startSF-CSS-RA-r13. K is the scaling factor given by UE-specific higher layer parameterss
$\alpha_{offset} = 0$ and $r_{max}$ is given by higher layer parameter mPDCCH-NumRepetition-RA.

Figure 8:
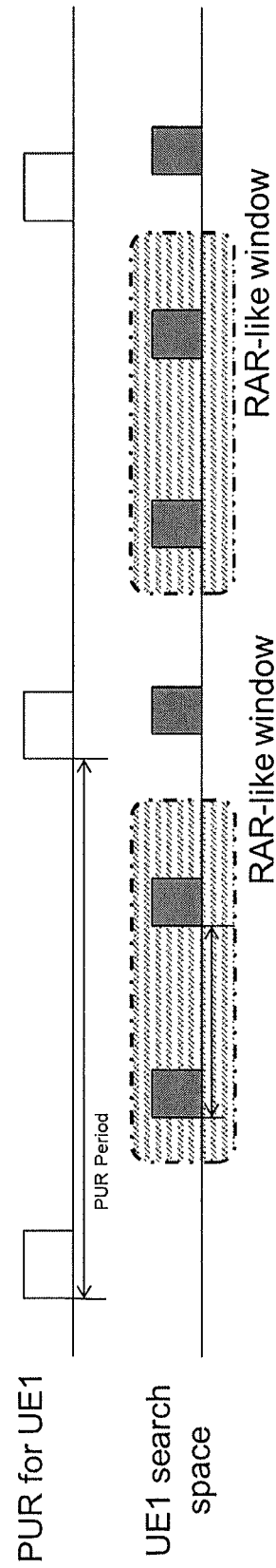
FIG. 8 is a schematic diagram illustrating another embodiment of a search space for uplink transmission based on PUR.

FIG. 8 is a schematic diagram illustrating another embodiment of a search space for uplink transmission based on PUR.

In some other embodiments, a number of repetitions of the first search space is scaled from a number of repetitions of a second search space by a third scaling factor L. The resource configuration further includes the third scaling factor L. The second search space is PDCCH type 2 common search space for eMTC and NBIoT. In one example, the UE 200 can be configured with a scaling parameter L=1/4, the repetition number of the MPDCCH/NPDCCH type 2 common search space is configured as Rmax=128, then the reduced repetition number of search space based on PUR is 32, which means 1) the MPDCCH/NPDCCH candidates are derived by Rmax=128 as MPDCCH/NPDCCH type 2 common search space, and the repetition number larger than 32 will be omitted by UE control signal blind detection, so only repetition number of 16 and 32 will be blindly detected; or 2) the repetition number of search space based on PUR is scaled to 32, and control signal repetition number of 32, 16, 8, 4 will be blindly detected.

Figure 9:
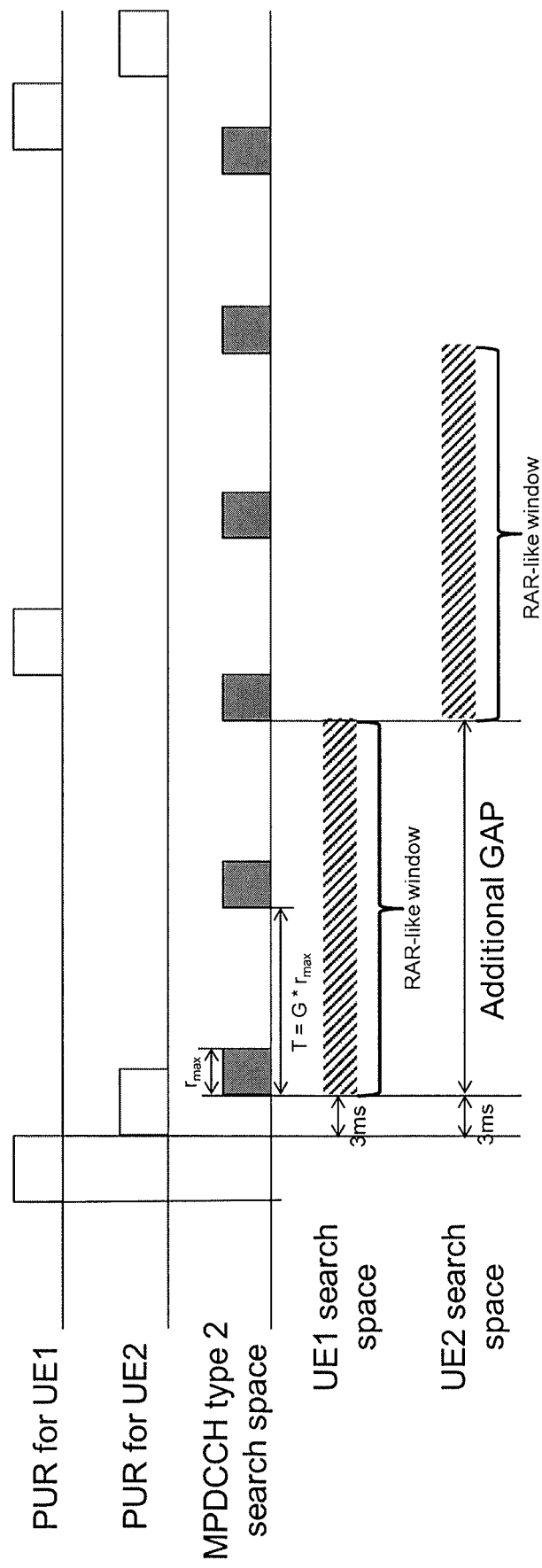
FIG. 9 is a schematic diagram illustrating a further embodiment of a search space for uplink transmission based on PUR.

FIG. 9 is a schematic diagram illustrating a further embodiment of a search space for uplink transmission based on PUR. In some embodiments, the apparatus receives the feedback control signal of the data in a response window; and the response window starts from a time slot that contains the end of data transmission plus a first time offset, and the response window has a second time duration. The first time offset includes a third number of a period of a control channel N3; and the resource configuration further includes the third number of the period of the control channel (MPDCCH or NPDCCH) N3. The second time duration is scaled from a random access response window by a fourth scaling factor W. The resource configuration further includes the fourth scaling factor W. The random access response window is the window for monitoring the response signal after preamble transmission in RACH procedure.

In one example, after the uplink transmission, a search window will be defined. The size of the search window can be scaled from the RAR window for MPDCCH/NPDCCH type 2 common search space as shown in FIG. 5B. For example, the UE 200 can be configured with a scaling parameter W=1/4, the RAR window size of the MPDCCH/NPDCCH type 2 common search space is configured as Nrar=8 MPDCCH/NPDCCH period. So the size of the search space window size can be 2 MPDCCH/NPDCCH period.

Additionally or alternatively, an additional gap may be introduced between the uplink transmission and the start of monitoring search space, and the gap is configured with the unit of period of MPDCCH. This adds flexibility for eNB/gNB and also helps to solve the problem of MPDCCH/NPDCCH collision issue for different UEs.

In some embodiments, the first search space is started in a narrowband, and an index of the narrowband is determined by at least one of: the period of the resource T, a RNTI, a coverage enhancement mode (CE mode), and a preamble index of the latest access.

The search space may also be further defined by the UE-specific RNTI and narrowband index. For example, UE monitor the search space 4 ms after uplink transmission with UE-specific RNTI in configured narrowband and starting subframe k0 satisfies the condition $(10n_f+\lfloor n_s/2 \rfloor) \bmod T=\lfloor \alpha_{offset} \cdot T \rfloor$, where $T=r_{max} \cdot G \cdot K$.

In one embodiment, the first search space is started in a narrowband, and the narrowband index is determined by the period of PUR, the PUR period P may be compared with a threshold value TH1. For example, if PUR period P>TH1, a first configured narrowband may be used, otherwise a second configured narrowband may be used.

In another embodiment, the first search space is started in a narrowband, and the narrowband index is determined by RNTI, For example, a modulo operation may be performed on the RNTI, and if RNTI %2==0, a first configured narrowband may be used, otherwise a second configured narrowband may be used. In another embodiment, the first search space is started in a narrowband, and the narrowband index is determined by a preamble index of the latest access. For example, a modulo operation may be performed on the preamble index of the latest intial access, and if preamble index %2==0, a first configured narrowband may be used, otherwise a second configured narrowband may be used.

For UE specific search space (USS) designs, the eNB may configure PUR parameter including at least a PUR duty cycle D and PUR period P, a new search space parameters G, Rmax and RAR window, and a UE-specific RNTI and narrowband index. The UE will monitor the search space after uplink transmission with UE-specific RNTI in configured narrowband and starting subframe k0 satisfies the condition $(10n_f+\lfloor n_s/2 \rfloor) \bmod T=\lfloor \alpha_{offset} \cdot T \rfloor$, where $T=r_{max} \cdot G$.

In some embodiments, there is provided an apparatus comprising: a transmitter that transmits a resource configuration; and a receiver that receives a data based on the resource configuration; wherein the transmitter further transmits a feedback control signal of the data in a first search space; wherein the resource configuration includes at least one of: a resource for the data, a period of the resource P, a duty cycle of the resource D, a duty period of the resource Ton, a frequency band of the feedback control signal, a transport block size of the data, a modulation and code scheme of the data, a number of repetitions of the feedback control signal R, a first scaling factor G of the first search space, a reduced blind detection indication, and a response window size T to receive the feedback control signal.

Figure 10A:
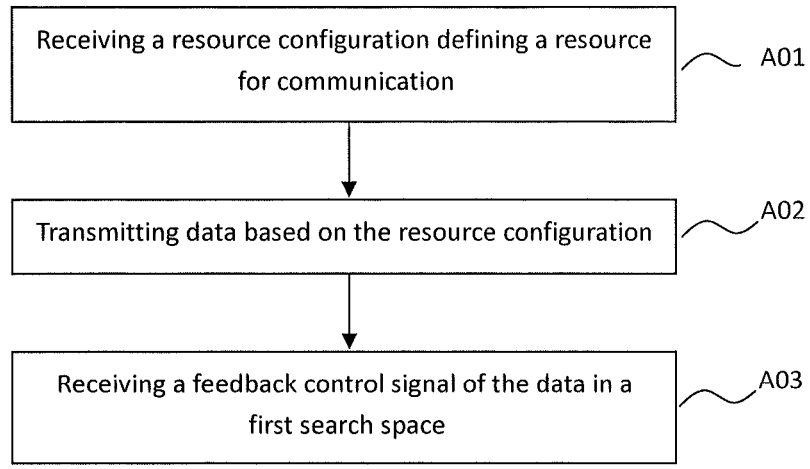
FIG. 10A is a flow diagram illustrating steps for transmission of data based on PUR and reception of a feedback control signal.

FIG. 10A is a flow diagram illustrating steps for transmission of data based on PUR and reception of a feedback control signal.

In step A01: the receiver 214 receives a resource configuration.

In step A02: the transmitter 212 transmits a data based on the resource configuration.

In step A03: the receiver 214 receives a feedback control signal of the data in a first search space.

The resource configuration includes at least one of: a resource for the data, a period of the resource P, a duty cycle of the resource D, or a duty period of resource Ton, a frequency band of the feedback control signal, a transport block size of the data, a modulation and code scheme of the data, a number of repetitions of the feedback control signal R, a first scaling factor G of the first search space, a reduced blind detection indication, and a response window size T to receive the feedback control signal.

Figure 10B:
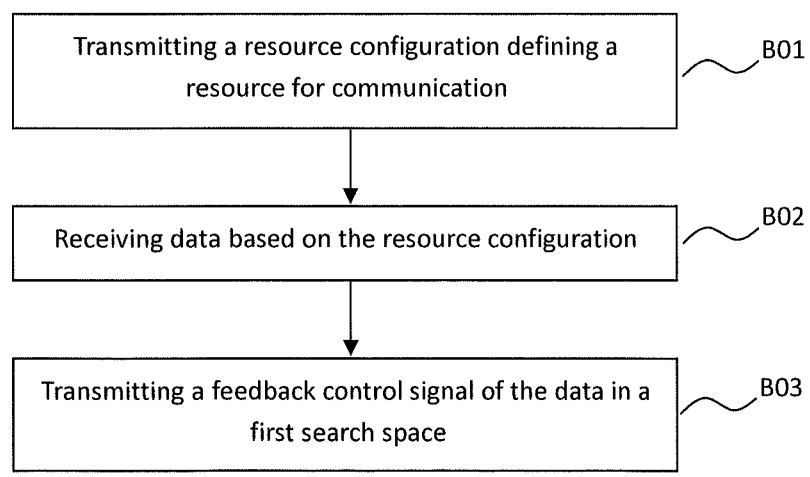
FIG. 10B is a flow diagram illustrating steps for reception of data based on PUR and transmission of a feedback control signal.

FIG. 10B is a flow diagram illustrating steps for reception of data based on PUR and transmission of a feedback control signal.

In step B01: the transmitter 312 transmits a resource configuration.

In step B02: the receiver 314 receives a data based on the resource configuration.

In step B03: the transmitter 312 transmits a feedback control signal of the data in a first search space.

The resource configuration includes at least one of: a resource for the data, a period of the resource P, a duty cycle of the resource D, or a duty period of resource Ton, a frequency band of the feedback control signal, a transport block size of the data, a modulation and code scheme of the data, a number of repetitions of the feedback control signal R, a first scaling factor G of the first search space, a reduced blind detection indication, and a response window size T to receive the feedback control signal.

The reduced blind detection indication, in some embodiments, may be a parameter that is set TRUE if the repetition number of the control signal Rmax is reduced.

In some embodiments, a period of the first search space is scaled from a period of a second search space by a second scaling factor K. The resource configuration may include the second scaling factor K. The second scaling factor K may be determined by at least one of: the period of the resource P, the response window size T, and a first number of control signal candidates N1 between two adjacent resources. The second search space is PDCCH type 2 common search space for eMTC and NBIoT.

In some other embodiments, a number of repetitions R of the first search space is scaled from a number of repetitions of a second search space by a third scaling factor L. The resource configuration further includes the third scaling factor L. The third scaling factor L may be determined by at least one of: the period of the resource P, the response window size T, and a second number of control signal candidates N2 between two adjacent resources. The second search space is PDCCH type 2 common search space for eMTC and NBIoT.

In some embodiments, the apparatus receives the feedback control signal of the data in a response window; and the response window starts from a time slot that contains the end of data transmission plus a first time offset, and the response window has a second time duration. The first time offset includes a third number of a period of a control channel N3; and the resource configuration further includes the third number of the period of the control channel (MPDCCH or NPDCCH) N3. The second time duration is scaled from a random access response window by a fourth scaling factor W. The resource configuration further includes the fourth scaling factor W. The random access response window is the window for monitoring the response signal after preamble transmission in RACH procedure. The fourth scaling factor W may be determined by at least one of: the period of the resource P, the response window size T, and a fourth number of control signal candidates N4 between two adjacent resources.

In some embodiments, the first search space is started in a narrowband, and an index of the narrowband is determined by at least one of: the period of the resource T, a RNTI, a coverage enhancement mode (CE mode), and a preamble index of the latest access.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a receiver that receives a resource configuration; and
a transmitter that transmits data based on the resource configuration;
wherein the receiver further receives a feedback control signal of the data in a first search space, and the resource configuration includes a resource for the data, a period of the resource P, a duty cycle of the resource D,
a duty period of the resource Ton, and;
a frequency band of the feedback control signal;
a transport block size of the data;
a modulation and code scheme of the data;
a number of repetitions of the feedback control signal R;
a first scaling factor G of the first search space;
a reduced blind detection indication;
a response window size T to receive the feedback control signal;
or some combination thereof, wherein the apparatus monitors the feedback control signal of the data in a response window, and the response window starts from a time slot that contains the end of data transmission plus a first time offset.

2. The apparatus of claim 1, wherein the response window has a second time duration.

3. The apparatus of claim 2, wherein the first time offset includes a period of a control channel N3, and the resource configuration further includes the period of the control channel N3.

4. The apparatus of claim 2, wherein the second time duration is scaled from a random access response window by a fourth scaling factor W.

5. The apparatus of claim 4, wherein the resource configuration further includes the scaling factor W.

6. The apparatus of claim 4, wherein the random access response window is the window for monitoring the response signal after preamble transmission in random access channel procedure.

7. The apparatus of claim 1, wherein the first search space is started in a narrowband, and an index of the narrowband is determined by at least one of:
the period of the resource T;
a radio network temporary identifier;
a coverage enhancement mode; and
a preamble index of the latest access.

8. A method comprising:
receiving, by a receiver, a resource configuration;
transmitting, by a transmitter, data based on the resource configuration; and
receiving, by the receiver, a feedback control signal of the data in a first search space, and the resource configuration includes a resource for the data, period of the resource P, a duty cycle of the resource D,
a duty period of the resource Ton, and;
a frequency band of the feedback control signal;
a transport block size of the data;
a modulation and code scheme of the data;
a number of repetitions of the feedback control signal R;
a first scaling factor G of the first search space;
a reduced blind detection indication;
a response window size T to receive the feedback control signal;
or some combination thereof; and
monitoring the feedback control signal of the data in a response window, wherein the response window starts from a time slot that contains the end of data transmission plus a first time offset.

9. The method of claim 8, wherein the response window has a second time duration.

10. The method of claim 9, wherein the first time offset includes a period of a control channel N3, and the resource configuration further includes the period of the control channel N3.

11. The method of claim 9, wherein the second time duration is scaled from a random access response window by a scaling factor W.

12. The method of claim 11, wherein the resource configuration further includes the scaling factor W.

13. The method of claim 11, wherein the random access response window is the window for monitoring the response signal after preamble transmission in random access channel procedure.

14. The method of claim 8, wherein the first search space is started in a narrowband, and an index of the narrowband is determined by at least one of:
the period of the resource T;
a radio network temporary identifier;
a coverage enhancement mode; and
a preamble index of the latest access.

15. An apparatus comprising:
a transmitter that transmits a resource configuration; and
a receiver that receives data based on the resource configuration;
wherein the transmitter further transmits a feedback control signal of the data in a first search space, and the resource configuration includes a resource for the data, period of the resource P, a duty cycle of the resource, a duty period of the resource Ton, and;
a frequency band of the feedback control signal;
a transport block size of the data;
a modulation and code scheme of the data;
a number of repetitions of the feedback control signal R;
a first scaling factor G of the first search space;
a reduced blind detection indication;
a response window size T to receive the feedback control signal;
or some combination thereof, wherein the apparatus transmits the feedback control signal of the data in a response window, and the response window starts from a time slot that contains the end of data transmission plus a first time offset.

16. The apparatus of claim 15, wherein the response window has a second time duration.

17. The apparatus of claim 16, wherein the first time offset includes a period of a control channel N3, and the resource configuration further includes the period of the control channel N3.

18. The apparatus of claim 16, wherein the second time duration is scaled from a random access response window by a scaling factor W.

19. The apparatus of claim 18, wherein the resource configuration further includes the scaling factor W.

20. The apparatus of claim 18, wherein the random access response window is the window for monitoring the response signal after preamble transmission in random access channel procedure.

* * * * *